United States Patent [19]

Furuyama

[11] Patent Number: 5,274,515
[45] Date of Patent: Dec. 28, 1993

[54] TRACKING CONTROL DEVICE FOR A VIDEO TAPE RECORDER

[75] Inventor: Takenoir Furuyama, Kanagawa, Japan

[73] Assignee: Sony Corporation, Tokyo, Japan

[21] Appl. No.: 866,810

[22] Filed: Apr. 9, 1992

[30] Foreign Application Priority Data

Nov. 4, 1991 [JP] Japan ................. 3-079360

[51] Int. Cl.⁵ ............................. G11B 5/592
[52] U.S. Cl. ..................... 360/77.16; 360/77.13
[58] Field of Search ..................... 360/77.13, 77.16

[56] References Cited

U.S. PATENT DOCUMENTS

| | | | |
|---|---|---|---|
| 4,825,311 | 4/1989 | Saito | 360/77.16 |
| 5,057,949 | 10/1991 | Suga et al. | 360/77.16 X |
| 5,072,319 | 12/1991 | Kohri et al. | 360/77.16 |
| 5,210,663 | 5/1993 | Nakase et al. | 360/77.16 |

Primary Examiner—Michael Koczo
Attorney, Agent, or Firm—William S. Frommer; Alvin Sinderbarand

[57] ABSTRACT

A tracking control device for controlling the positions of magnetic heads mounted on bimorphs relative to a recording medium. The device comprises means for detecting the transport speed of the recording medium; means for generating a first drive signal in response to the output of the speed detecting means; means for detecting the position of the recording medium; means for generating a second drive signal in response to the output of the position detecting means and the output of the speed detecting means; means for detecting any track deviation in response to the output of each head; means for generating a third drive signal in response to the output of the deviation detecting means; means for adding the first, second and third drive signals; and means for supplying the output of the adding means to the relevant bimorph; wherein at least two of magnetic heads are so disposed as to have an offset therebetween, and the drive signal generating means are controlled on the basis of the difference between the envelope signals outputted from the heads. In this device, proper tracking can be ensured continuously despite any external factors of disturbance.

4 Claims, 15 Drawing Sheets

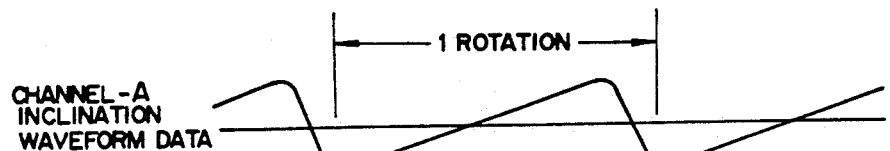
FIG.3A CHANNEL-A INCLINATION WAVEFORM DATA
FIG.3B CHANNEL-B INCLINATION WAVEFORM DATA
FIG.3C CHANNEL-A RINGING WAVEFORM DATA
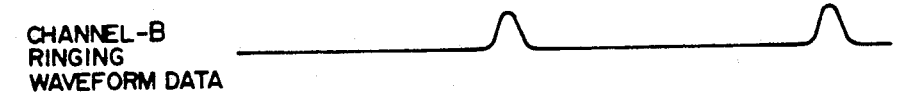
FIG.3D CHANNEL-B RINGING WAVEFORM DATA
FIG.3E CHANNEL-A JOINT WAVEFORM DATA
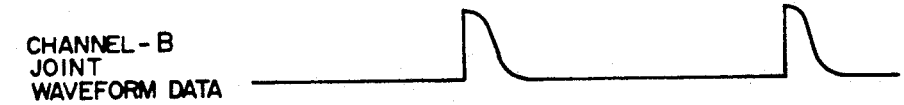
FIG.3F CHANNEL-B JOINT WAVEFORM DATA
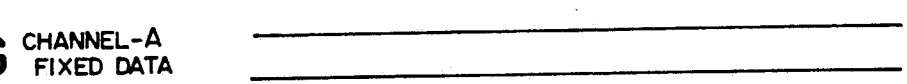
FIG.3G CHANNEL-A FIXED DATA
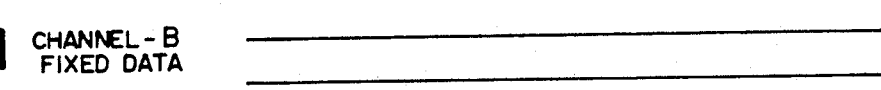
FIG.3H CHANNEL-B FIXED DATA

| (rad) θ | Si 1 | Si 2 | R1 (Ω) | R2 | R3 | R4 |
|---|---|---|---|---|---|---|
| 0 | FG(A) | / | 1K | / | 51K | 1K |
| 1/16π | FG(A) | FG(B) | 1.1K | 5.6K | 56K | 1K |
| 2/16π | FG(A) | FG(B) | 1.5K | 3.6K | 62K | 1K |
| 3/16π | FG(A) | FG(B) | 1.6K | 2.4K | 68K | 1K |
| 4/16π | FG(A) | FG(B) | 2K | 2K | 68K | 1K |
| 5/16π | FG(A) | FG(B) | 2.4K | 1.6K | 68K | 1K |
| 6/16π | FG(A) | FG(B) | 3.6K | 1.5K | 62K | 1K |
| 7/16π | FG(A) | FG(B) | 5.6K | 1.1K | 56K | 1K |
| 8/16π | / | FG(B) | / | 1K | 51K | 1K |
| 9/16π | FG(A)' | FG(B) | 5.6K | 1.1K | 56K | 1K |
| 10/16π | FG(A)' | FG(B) | 3.6K | 1.5K | 62K | 1K |
| 11/16π | FG(A)' | FG(B) | 2.4K | 1.6K | 68K | 1K |
| 12/16π | FG(A)' | FG(B) | 2K | 2K | 68K | 1K |
| 13/16π | FG(A)' | FG(B) | 1.6K | 2.4K | 68K | 1K |
| 14/16π | FG(A)' | FG(B) | 1.5K | 3.6K | 56K | 1K |
| 15/16π | FG(A)' | FG(B) | 1.1K | 5.6K | 51K | 1K |

$$\begin{cases} V = 5(V) \\ a = 1(V) \\ H = 10 \\ Z = Z' = 1K(\Omega) \end{cases}$$

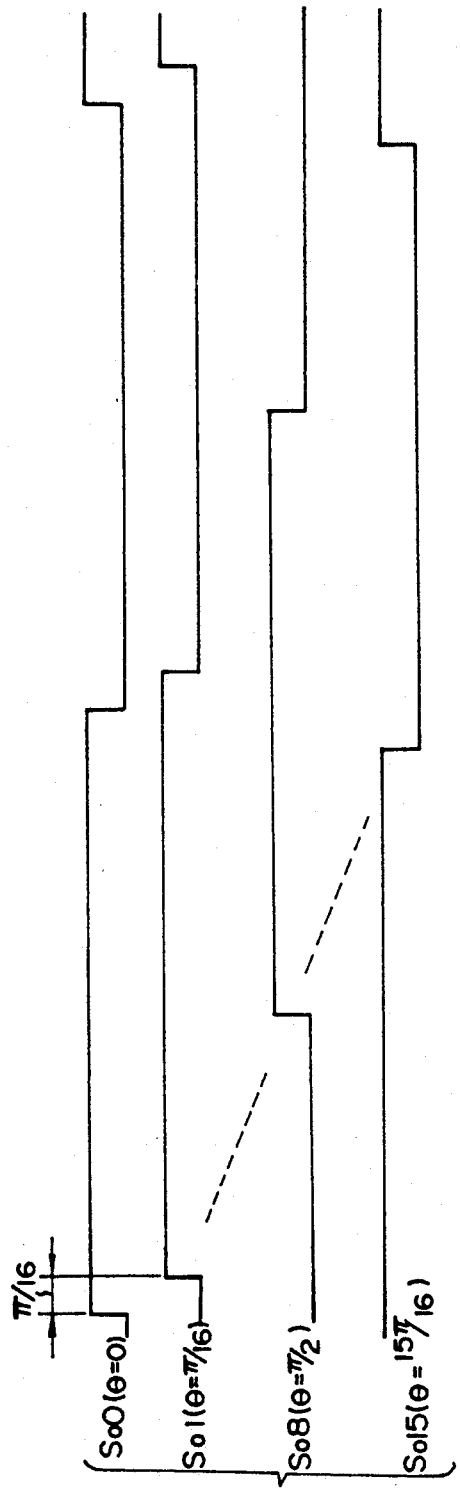
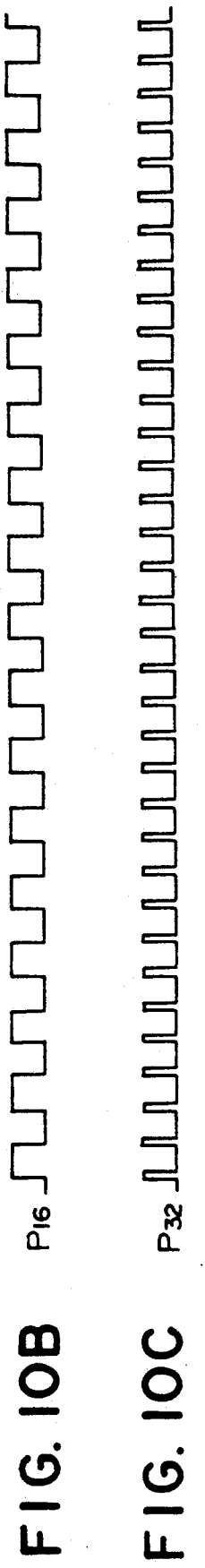
FIG. 10A
FIG. 10B
FIG. 10C

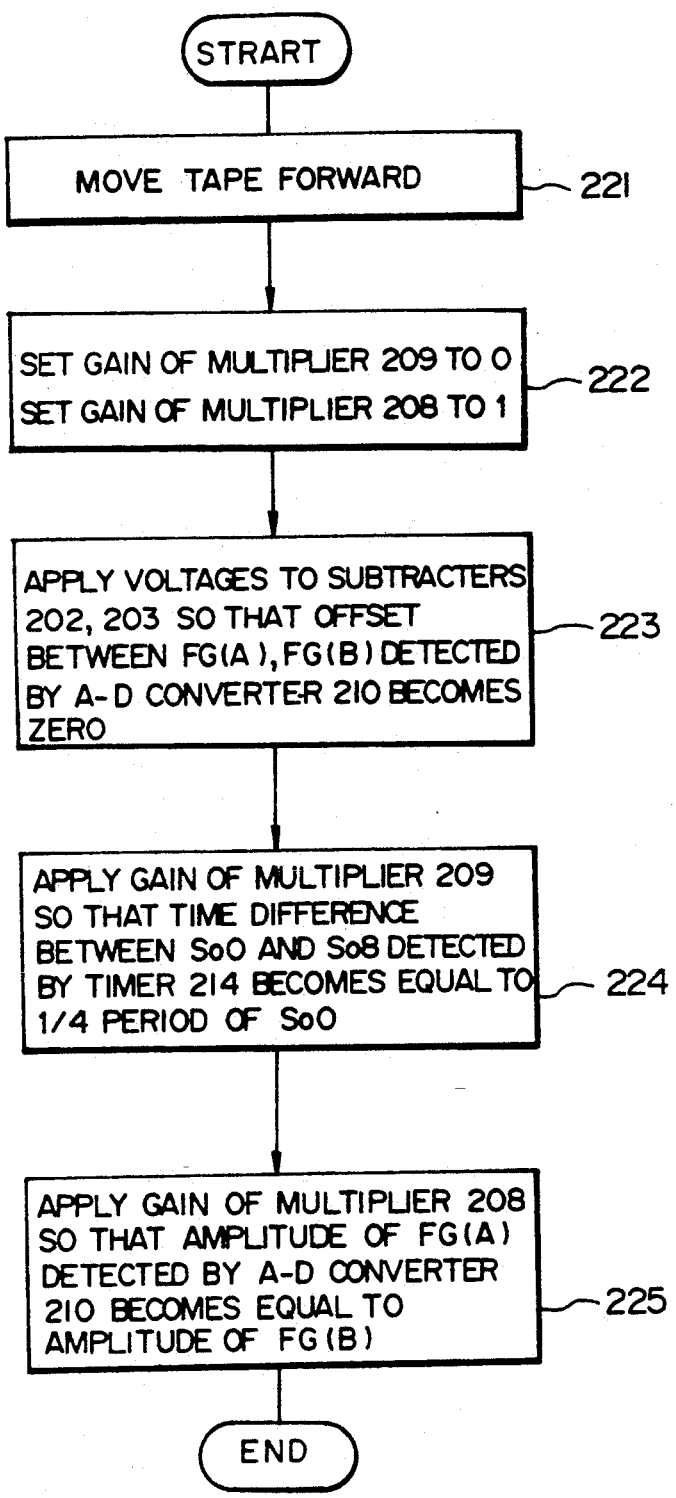

1,2,3,4 CHANNEL NUMBERS
O ODD SAMPLE
E EVEN SAMPLE

TRACKING CONTROL DEVICE FOR A VIDEO TAPE RECORDER

BACKGROUND OF THE INVENTION

1. Field of the Invention

The present invention relates to a tracking control device adapted for use in a video tape recorder (VTR) to correct any tracking error by changing the positions of magnetic heads by means of bimorphs.

2. Description of the Prior Art

FIG. 21 illustrates a track pattern in the D-1 digital VTR format (525/60 system).

In the diagram, there are shown a magnetic tape 1, a cue track 2, a control track 3 and a time code track 4. A servo reference signal is recorded on the control track 3 at an interval of four video tracks.

Denoted by 5U and 5L respectively are a video upper sector and a video lower sector which constitute video tracks. Here an aggregate pattern of tracks is termed "sector". Shown in FIG. 21 are tracks of one field.

In the 525/60 system, a 1-field video signal is composed of 20 sectors, where each field begins at an upper sector 5U and terminates at a lower sector 5L. Each field is divided into 5 segments, and data of 1 segment is stored in 4 sectors shaded in the diagram. More specifically, data of 1 segment is recorded in the 4 sectors astride the 4 tracks A to D.

In such arrangement, merely a quarter of one segment is harmfully affected if one of the 4 tracks is rendered unusable due to some damage to the head or if the error rate is extremely deteriorated. Furthermore, since the video signal is sequentially distributed to the 4 tracks (sectors) in conformity with the time series, the error correcting function can be fully performed even when the data of any one track is lost.

Denoted by 6 is an audio sector disposed substantially at the center of the tape 1 to form audio tracks. Selection of such position is based on the reason that, even if any skew occurs in the tape, the center is affected minimally.

FIG. 22 illustrates an arrangement of audio sectors, wherein 4-channel audio data temporally concomitant with the video data of 2 shaded segments are recorded in 16 sectors. The length of the error correction block is reduced to minimize the undesired possibility that the data in any sector unconcerned with editing is read and rewritten. Such reduction of the error correction block length diminishes the capability of correction for flaw in the longitudinal direction of the tape or dropouts along the tracks, but such demerit is compensated by writing the same data twice.

FIG. 23 shows an exemplary rotary magnetic head device, wherein a rotary drum 7 is equipped with channel-A playback magnetic heads Ha, Hb, Hc', Hd' and channel-B playback magnetic heads Hc, Hd, Ha', Hb' disposed substantially at angular intervals of 180°. The distance d between the heads is set in conformity with the track pitch in such a manner that, when the head Ha scans the track A, the heads Hb, Hc', Hd' scan the tracks B, C, D respectively (FIG. 24). The same setting is applied to the heads Hc, Hd, Ha', Hb' as well.

In a playback mode, the heads Ha, Hb, Hc', Hd' (Hc, Hd, Ha', Hb') scan the four tracks A, B, C, D respectively so that both the video data and the audio data are reproduced therefrom. In FIG. 23, recording heads are not shown.

In a normal 1-fold speed playback mode, the scanning angle of each head on the tape 1 becomes equal to the angle of the track recorded on the tape. However, in a playback mode at any different speed, the scanning angle of the head fails to be coincident with the track angle, so that there occurs a track deviation (inclination error) which appears to be guard band noise on the reproduced image. FIG. 25 illustrates scanning loci of the heads in a −1-fold speed mode, a still playback mode, a +1-fold speed mode and a +2.5-fold speed mode.

For the purpose of eliminating such track deviation, there is proposed a method of firmly attaching each head to a bimorph and controlling the head position by means of the bimorph. For driving the bimorph in this case, there are required a track inclination waveform signal, a tracking waveform signal, a ringing waveform signal and a tracking error correction waveform signal.

In any mode other than a +1-fold speed mode, each head scans the recorded track on the tape obliquely at a predetermined angle of inclination conforming with the tape speed. Therefore it is necessary to change the head position in a manner to correct the angle of inclination. The track inclination waveform signal is used for changing such position.

At any speed other than a +1-fold speed, it is fundamentally impossible to maintain the fixed relationship between the head and the track. Therefore a correction needs to be executed by changing the head position in accordance with the tape transport position. The tracking waveform signal is used for execution of such correction.

When the bimorph is driven, there may occur unrequired vibration by hysteresis or mechanical resonance to consequently disorder the tracking. The ringing waveform signal is added during a blanking period (non-scanning time) so as to correct such unrequired vibration.

And the tracking error correction waveform signal is used for optimizing the other tracking.

In the execution of tracking under predictive control, there exists the possibility that the tracking is disturbed by a variety of factors including deterioration of the circuits, temperature characteristics, and conditions of the playback tape.

Correction of any track deviation with a shift of the entirety as in a +1-fold speed mode can be achieved by correcting the DC component.

However, in any different-speed playback mode, some track deviation is caused also by other factors such as the predicted value of the track pitch gain for obtaining a tracking waveform signal, and the predicted value of the track inclination gain for obtaining a track inclination waveform signal.

Correction of the track deviation resulting from such predicted values is not achievable by mere addition of the DC component, and such means fails to attain complete correction of the track deviation.

OBJECT AND SUMMARY OF THE INVENTION

It is an object of the present invention to provide an improved tracking control device which is capable of realizing proper tracking continuously despite any external factors of disturbance.

According to one aspect of the present invention, there is provided a tracking control device for controlling the positions of magnetic heads mounted on bimorphs relative to a recording medium. The device comprises means for detecting the transport speed of the recording medium; means for generating a first drive signal in response to the output of the speed detecting means; means for detecting the position of the recording medium; means for generating a second drive signal in response to the output of the position detecting means and the output of the speed detecting means; means for detecting any track deviation in response to the output of each head; means for generating a third drive signal in response to the output of the deviation detecting means; means for adding the first, second and third drive signals; and means for supplying the output of the adding means to the relevant bimorph. In this device, at least two of the magnetic heads are so disposed as to have an offset therebetween, and the drive signal generating means are controlled on the basis of the difference between the envelope signals outputted from the heads.

The difference between the envelope signals includes, in addition to the DC component, control data relative to the predictive values of the track pitch gain and the track inclination gain. Therefore the individual parameters can be optimized to realize proper tracking continuously despite the existence of any external disturbance factors.

The above and other features and advantages of the present invention will become apparent from the following description which will be given with reference to the illustrative accompanying drawings.

BRIEF DESCRIPTION OF THE DRAWINGS

FIGS. 3A to 3H show waveform data in an analog form;

FIG. 10A to 10C are a timing chart for explaining the operation to generate pulses;

FIG. 11 is a flow chart showing the procedure of control in the pulse generator;

DESCRIPTION OF THE PREFERRED EMBODIMENT

Figure 1:
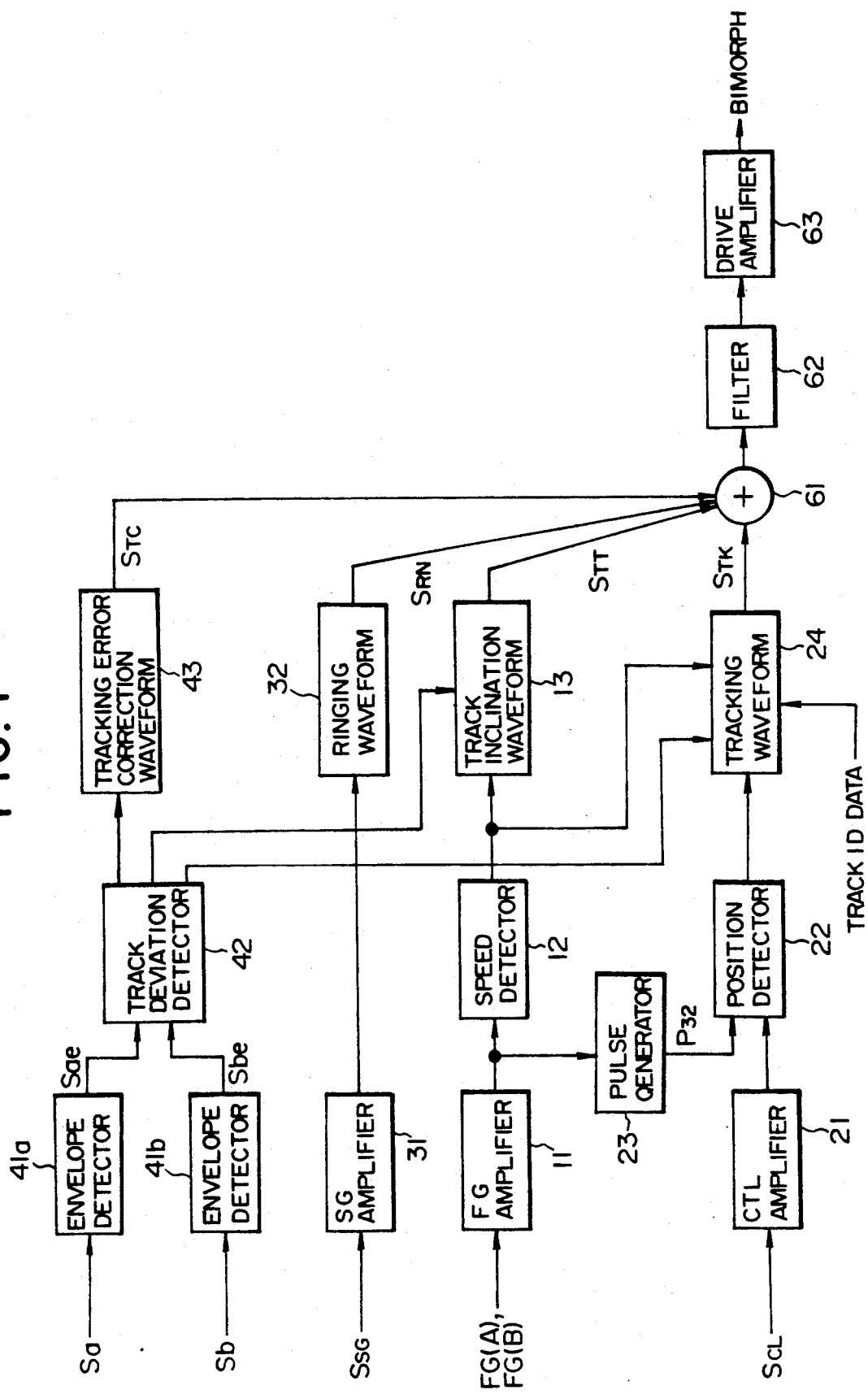
FIG. 1 is a block diagram showing the constitution of a dynamic tracking circuit.

Hereinafter an exemplary embodiment of the present invention will be described with reference to the accompanying drawings. FIG. 1 is a block diagram showing the entire constitution of a dynamic tracking circuit.

In the diagram, frequency signals FG(A) and FG(B) mutually having a 90° phase difference are outputted from a frequency generator FG attached to the rotary shaft of a capstan motor and then are supplied via an FG amplifier 11 to a speed detector 12. In the speed detector 12, a tape speed s is detected from the frequency signal FG(A), and the data representing such detected speed is supplied to a track inclination waveform output circuit 13, which then produces a track inclination waveform signal STT corresponding to the tape speed s, and the signal STT thus obtained is supplied to an adder 61.

The amplitude r of the inclination waveform signal STT is given by $$r = a(s) \cdot (s-1) \qquad \ldots (1)$$

where a(s) denotes the gain to the tape speed, and s denotes the tape speed (s=n in n-fold speed mode).

A servo reference signal SGL detected at an interval of 4 video tracks from the control track 3 is supplied via a control amplifier 21 to a position detector 22. The output signals FG(A) and FG(B) of the FG amplifier 11 are supplied to a pulse generator 23, which then produces pulses P32 of a frequency 32 times that of the signal FG(A). The pulses P32 thus obtained are supplied to the position detector 22.

In the position detector 22, the pulses P32 are counted to detect the tape position x with the servo reference signal SCL used as a reset signal. The data representative of the tape position is supplied to a tracking waveform output circuit 2A, to which the tape speed data outputted from the speed detector 12 is also supplied. The waveform output circuit 24 produces a tracking waveform signal STK corresponding to the tape position x, and the signal STK is supplied to an adder 61.

The amplitude h of the waveform signal STK is given by $$h = p(s) \cdot (mod\ (x+q \cdot xo \cdot s,\ c) - 0.5c) \qquad \ldots (2)$$

where p(s) is the gain of the track pitch; q is the delay time from detection of the tape position x to the tracking executed practically in accordance with such data; xo is the distance of advance per unit time at a +1-fold speed; s is the tape speed (s=n in n-fold speed mode); and c is the amount corresponding to the track pitch. In Eq. (2), mod (x+q·xo·s, c) is the remainder of the division (x+q·xo·s)/c, and its numerical value is within a range of 0 to o.

Track ID data is supplied from a signal processor (not shown) to the tracking waveform output circuit 24. The ID data is used to detect which of the tracks is being scanned by the head, and the tracking waveform signal STK is so controlled that, in a playback mode, the heads Ha (Ha'), Hb (Hb'), Hc (Hc'), Hd (Hd') scan the tracks A, B, C, D respectively.

An output signal SSG from a strain gauge (not shown) stuck to the bimorph is supplied via an SG amplifier 31 to a ringing waveform output circuit 32. This signal SSG indicates the motion of the head so that both the level and the position of the ringing can be detected from the signal SSG. A ringing waveform signal SRN corresponding to the level and position of the ringing is obtained from a waveform output circuit 32 and then is supplied to an adder 61.

Reproduced RF signals Sa, Sb from the heads Ha, Hb are supplied respectively to envelope detectors 41a, 41b, from which envelope signals Sae, Sbe are outputted and supplied to a track deviation detector 42. Then this detector 42 calculates the difference between the envelope signals Sae and Sbe, and such difference signal is supplied as tracking error data to a tracking error correction waveform output circuit 43. The output circuit 43 produces a tracking error correction waveform signal STC for reducing the difference signal to zero, and the signal STC is supplied to the adder 61.

The track inclination waveform signal STT and the tracking waveform signal STK are modified on the basis of the difference signal between the envelope signals Sae and Sbe. Such modification will be described later in detail.

The signals STT, STK, STC and SRN are added in the adder 61, and the resultant signal is supplied as a drive signal to the bimorph via a high-pass filter 62 and a drive amplifier 63.

The dynamic tracking circuit of FIG. 1 is relevant to the bimorph for the channel A where the heads Ha, Hb, Hc', Hd' are mounted. And the same configuration is employed in another circuit relevant to the bimorph for the channel B where the heads Hc, Hd, Ha', Hb' are mounted. In the latter circuit, reproduced RF signals Se and Sd from the heads Hc and Hd are used for detecting the track deviations.

Figure 2:
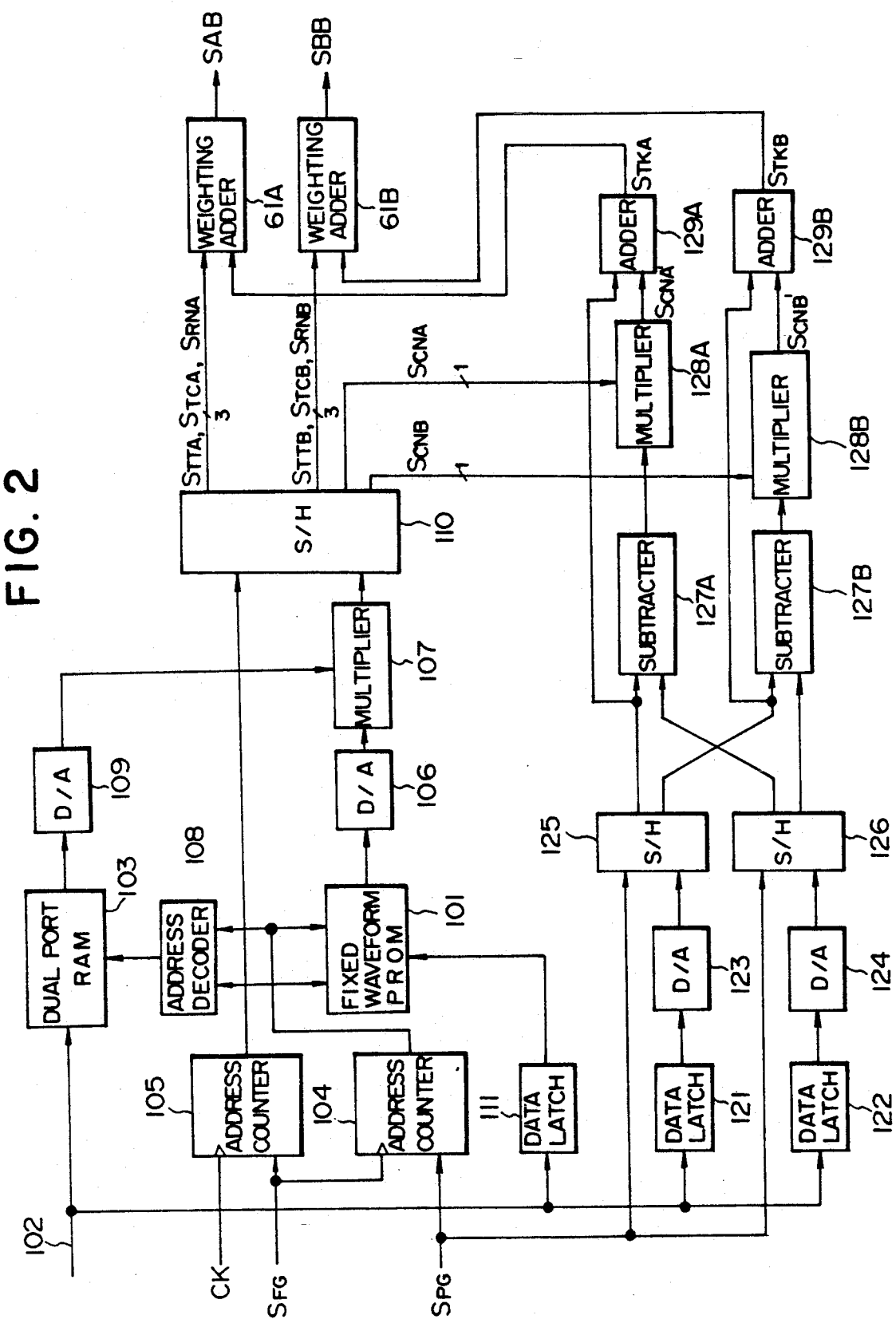
FIG. 2 is a block diagram showing the constitution of a waveform output circuit.

FIG. 2 shows exemplary constitutions of the track inclination waveform output circuit 13, the tracking waveform output circuit 24, the tracking error correction waveform output circuit 43 and the ringing waveform output circuit 32.

Denoted by 101 in FIG. 2 is a PROM where reference waveform data are written. In the PROM 101, there are previously stored inclination waveform data for obtaining a track inclination waveform signal, joint waveform data for obtaining a joint waveform signal relative to the tracking waveform signals, fixed data for obtaining a tracking error correction waveform signal, and ringing waveform data for obtaining a ringing waveform signal. Such waveform data are written with regard to the two channels A and B. (FIGS. 3A to 3H show analog waveforms representing 8 kinds of waveform data.)

Denoted by 102 is a CPU bus connected to a dual port RAM 103, where coefficient data corresponding to the 8 kinds of waveform data stored in the PROM 101 are written. The coefficient data corresponding to the inclination waveform data is determined in an unshown CPU as given by Eq. (1) on the basis of the tape speed information obtained from the speed detector 12 (FIG. 1). The coefficient data corresponding to the joint waveform data is retained at a fixed value. Meanwhile the coefficient data corresponding to the ringing waveform data is determined in the CPU on the basis of the signal SSG obtained from the strain gage. And the coefficient data corresponding to the fixed data is determined in the CPU on the basis of the tracking error information from the track deviation detector 42.

Figure 4A:
FIG. 4A to 4C are a timing chart for explaining an address signal.
Figure 23:
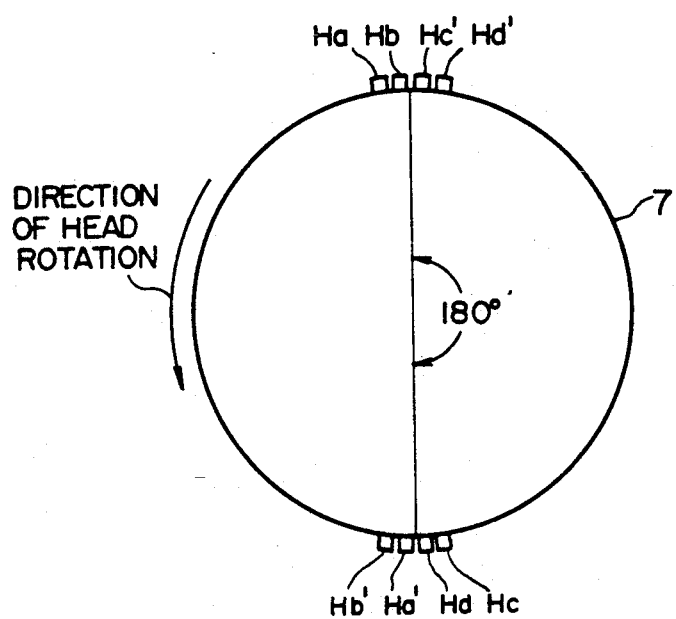
FIG. 23 schematically shows the structure of a rotary magnetic head device.

The pulse signal SPG indicating the rotation phase of the head is outputted (one pulse per rotation of the head) from the pulse generator (drum PG) attached to the rotary drum 7 (FIG. 23) and is supplied as a reset signal to an address counter 104. Meanwhile, the frequency signal SPG (shown in FIG. 4A) from the frequency generator (drum PG) attached to the rotary drum 7 is supplied as a clock signal also to the address counter 104, whereby its count output is changed in accordance with the rotational position of the head, and such change is repeated cyclically per rotation.

Figure 4B:
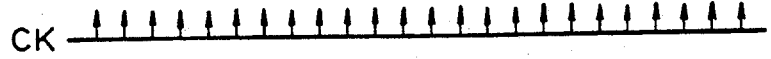
Figure 4C:
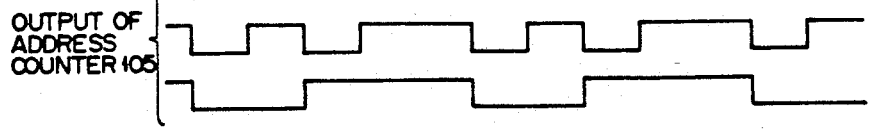

The frequency signal SFG is further supplied as a reset signal to an address counter 105. Meanwhile a clock signal CK synchronized with the frequency signal SFG is supplied as clock pulses to the address counter 105. The requirement for the clock signal CK is satisfied if its frequency is eight times or more in comparison with the signal SFG. FIG. 4B shows an exemplary clock signal whose frequency is 10 times. Accordingly the count output of the address counter 105 is changed in a range of 0 to 7 within the period of the frequency signal SFG.

The count outputs of the address counters 104, 105 are supplied as upper and lower address signals respectively to the PROM 101, and the eight kinds of waveform data are read out therefrom repeatedly per rotation of the head. In this case, the eight kinds of waveform data are read out by time division in accordance with the lower address signal. More specifically, one sample data out of the eight kinds of waveform data is read every period of the frequency signal SFG.

The waveform data outputted from the PROM 101 is converted to an analog signal by a D-A converter 106 and then is supplied to a multiplier 107.

The count outputs of the address counters 104, 105 are supplied to an address decoder 108. The inclination waveform signal STT, the tracking waveform signal STK and the ringing waveform signal SRN can be generated through multiplication of the inclination waveform data, the joint waveform data and the ringing waveform data respectively by fixed coefficient data which remains equal during the rotation period of the head. Therefore the same address signal is outputted from the address decoder 108 in synchronism with reading out the inclination waveform data, the joint waveform data and the ringing waveform data from the PROM 101.

Meanwhile the tracking error correction waveform signal STC can be generated through multiplication of the fixed data by coefficient data changed on the basis of the tracking error information. This coefficient data is changed in accordance with the rotational position of the head. Therefore, sequentially different address signals are outputted from the address decoder 108 in synchronism with the fixed data outputted from the PROM 101.

The address signal outputted from the address decoder 108 is supplied to a RAM 103, which stores one coefficient data relative to each of the inclination waveform data, the joint waveform data and the ringing waveform data of two channels, and also stores a plurality of coefficient data relative to the fixed data of two channels.

The coefficient data relative to the eight kinds of waveform data are read out from the RAM 103 by time division in response to the address signal obtained from the address decoder 108. The coefficient data are converted to analog signals by a D-A converter 109 and then are supplied to a multiplier 107. In this stage, if there occurs a coincidence between two series of addresses due to the characteristic of the dual port RAM 103, the access to the higher-priority address alone is rendered effective while the access to the other address is neglected. In this embodiment, the address and the data concerned with the D-A converter 109 are given first priority so as to prevent interruption of reading out the coefficient data.

Figure 5:
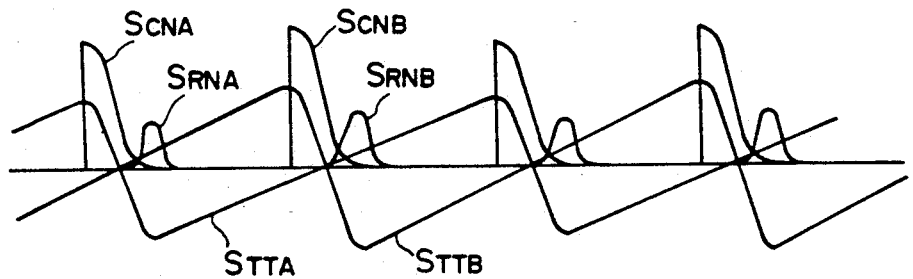
FIG. 5 shows a composite signal produced by time division prior to a sampling and holding process.

In the multiplier 107, the inclination waveform data, the joint waveform data, the ringing waveform data and the fixed data outputted from the PROM 101 are multiplied respectively by the coefficient data relative thereto. Consequently, the multiplier 107 produces inclination waveform signals STTA and STTB, joint wave-form signals SCNA and SCNB, ringing waveform signals SRNA and SRNB, and tracking error correction waveform signals STCA and STCB of the two channels A and B by time division. Such output signals are supplied to a sample-and-hold circuit 110. FIG. 5 shows the output signals of the multiplier 107, wherein the tracking error correction waveform signals STCA and STCB are omitted for the purpose of simplifying the diagram.

The count output of the address counter 105 is supplied as a sampling timing signal to the sample-and-hold circuit 110, where the eight kinds of signals of the two channels A and B are sampled and held individually.

The inclination waveform signals STTA and STTB, the ringing waveform signals SRNA and SRNB, and the tracking error correction waveform signals STCA and STCB of the channels A and B outputted from the sample-and-hold circuit 110 are supplied respectively to adders 61A and 61B.

The CPU bus 102 is connected to a data latch circuit 111, which serves to latch the pattern selecting data outputted from the CPU with regard to the PROM 101. Consequently the pattern of the ringing waveform data read out from the PROM 101 is selected to execute such adjustment that the ringing waveform signal conforming with the ringing position is obtained.

The CPU bus 102 is connected also to data latch circuits 121 and 122, which serve to latch the amplitude data (Eq. (2)) of the tracking waveform signals of two channels outputted from the CPU. In this case, the latch circuit 121 latches the following (N) amplitude data of the channels A and B, while the latch circuit 122 latches the preceding (N−1) amplitude data of the channels A and B.

The output signals of the latch circuits 121, 122 are converted to analog signals by D-A converters 123, 124 respectively and then are supplied to sample-and-hold circuits 125, 126, to which the pulse signal SPG is supplied as a sampling timing reference signal.

The circuit 125 samples and holds the following amplitude signals of the channels A and B with a phase difference of half rotation, while the circuit 126 samples and holds the preceding amplitude signals of the channels A and B with a phase difference of half rotation.

Figure 6:
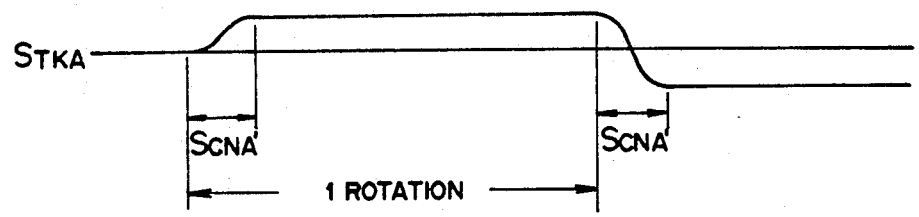
FIG. 6 shows a tracking waveform signal.

The following amplitude signal and the preceding amplitude signal of the channel A outputted from the sample-and-hold circuits 125, 126 are supplied to a subtracter 127A, where the following amplitude signal is subtracted from the preceding amplitude signal. The difference signal obtained from the subtracter 127A is supplied to a multiplier 128A and then is multiplied by the channel-A joint waveform signal SCNA outputted from the sample-and-hold circuit 110. Consequently the multiplier 128A produces a joint waveform signal SCNA' which corresponds to the difference between the following and preceding amplitude signals. The signal SCNA' thus obtained is supplied to an adder 129A so as to be added to the following amplitude signal. Then the adder 129A produces a tracking waveform signal STKA (shown in FIG. 6) where the preceding amplitude signal is naturally joined to the following amplitude signal, and the signal STKA is supplied to the adder 61A.

Meanwhile the following amplitude signal and the preceding amplitude signal of the channel B outputted from the sample-and-hold circuits 125, 126 are supplied to a subtracter 127B, where the following amplitude signal is subtracted from the preceding amplitude signal. Thereafter the difference signal outputted from the subtracter 127B is supplied to a multiplier 128B and then is multiplied by the channel-B joint waveform signal SCNB obtained from the sample-and-hold circuit 110. Consequently the multiplier 128B produces a joint waveform signal SCNB' which corresponds to the difference between the following and preceding amplitude signals, and the signal SCNB' is supplied to an adder 129B so as to be added to the following amplitude signal. Then the adder 129B produces a tracking waveform signal STKB where the preceding amplitude signal is naturally joined to the following amplitude signal, and the signal STKB is supplied to the adder 61B.

In the adder 61A, the signals STTA, STKA, SRNA and STCA are weighted and added to form an added signal SAB, which is then delivered via the high-pass filter 62 and the drive amplifier 63 so as to be used as a drive signal for the bimorph of the channel A.

Meanwhile in the adder 61B, the signals STTB, STKB, SRNB and STCB are weighted and added to form an added signal SBB, which is then delivered via the high-pass filter 62 and the drive amplifier 63 so as to be used as a drive signal for the bimorph of the channel B.

Figure 7:
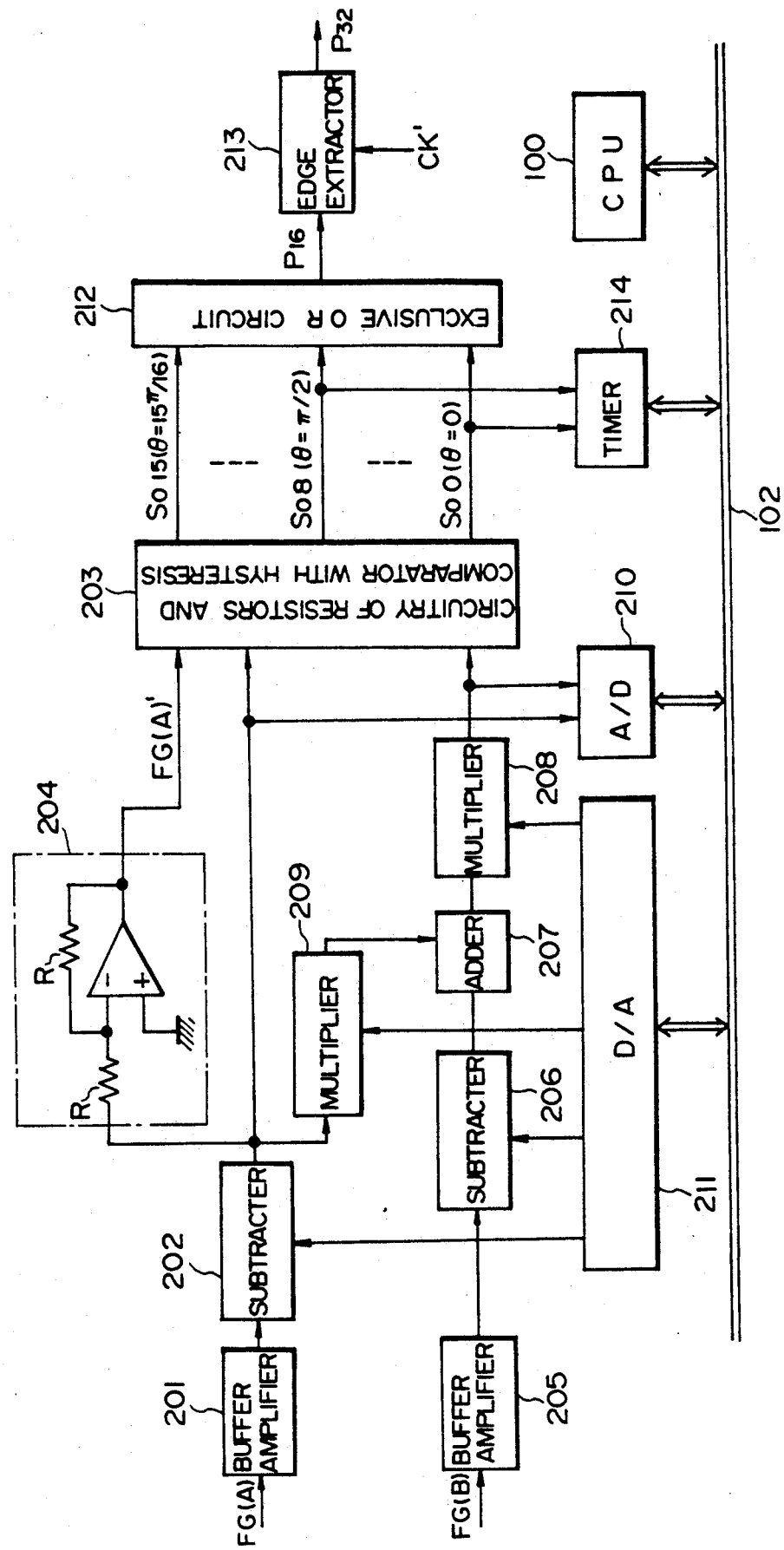
FIG. 7 is a block diagram showing the constitution of a pulse generator.

Now the specific circuit configuration of the pulse generator 23 will be described below. Denoted by FG(A) and FG(B) in FIG. 7 are substantially sinusoidal signals (frequency signals) outputted from the PG amplifier 11 (shown in FIG. 1) in a manner to have a 90° phase difference therebetween.

The signal FG(A) is supplied via a series circuit of a buffer amplifier 201 and a subtracter 202 to a circuitry 203 comprising resistors and a comparator with hysteresis.

The output signal of the subtracter 202 is supplied to an inverting amplifier 204, whose output signal FD(A)' is then supplied to the circuitry 203.

Meanwhile the signal FG(B) is supplied to the circuitry 203 via a buffer amplifier 205, a subtracter 206, an adder 207 and a multiplier 208. The output signal of the subtracter 202 is supplied via a multiplier 209 to the adder 207.

The output signals of both the subtracter 202 and the multiplier 208 are converted to digital signals by an A-D converter 210 and then are supplied via the CPU bus 102 to the CPU 100. The subtractive signal and the multiplicative signal obtained from the CPU 100 via the CPU bus 102 are converted to analog signals by a D-A converter 211 and then are supplied to subtracters 202, 206 and multipliers 208, 209 respectively.

Figures 8, 9:
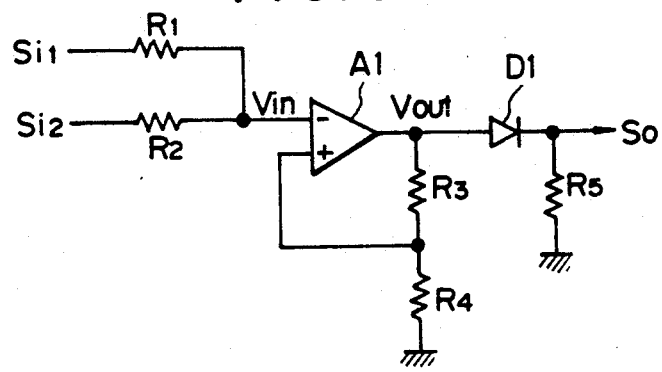
FIG. 8 is a partial connection diagram of circuits constituting the pulse generator.
FIG. 9 shows combinations of inputs and resistors in the, pulse generator of FIG. 8.

The circuitry 203 comprises 16 circuits each consisting of resistors and a comparator with hysteresis as shown in FIG. 8. Input signals Si1, Si2 are added to each other via resistors R1, R2 and then are supplied to a negative input terminal of a comparator A1. The resistors R1, R2 serve to determine the weights for the signals Si1, Si2. And the comparator A1 produces an output inverted symmetrically to a positive voltage and a negative voltage.

The output terminal of the comparator A1 is grounded via a series circuit of resistors R3 and R4, whose junction is connected to a positive input terminal of the comparator A1. The values of the resistors R3, R4 are determined by the amplitude of Vin, that of Vout and the amount of hysteresis H.

The output terminal of the comparator A1 is grounded via a series circuit of a diode D1 and a resistor R5, and an output signal is obtained from the junction of the diode D1 and the resistor R5. Such diode D1 and resistor R5 serve to limit the amplitude of the output.

In the circuitry 203, the input signals Si1, Si2 and the resistors R1 to R4 in each of the 16 circuits having the constitution of FIG. 8 are numerically set as shown in FIG. 9. Accordingly the 16 circuits produce signals So0 to So15 having a phase difference of $\pi k/16$ (where $k=0, 1 \ldots 15$) to one another. Such signals So0 to So15 are rectangular in waveform with a duty factor of 50%.

The values of the resistors R1 to R4 are calculated as follows.

First, Vin is set as $$Vin = a \cdot \sin(t+\theta)$$

where $\theta$ is the phase difference from FG(A), and $0 \leq \theta < \pi$. Since $$Vin = a(\cos\theta \cdot \sin t + \sin\theta \cdot \cos t),$$

it is considered here that $$FG(A) = a \cdot \sin t, \quad FG(B) = a \cdot \cos t$$

in which the amplitudes of FG(A) and FG(B) are equal to each other, and no offset is existent. Then, the above is rewritten as $$Vin = \cos \cdot FG(A) + \sin \cdot FG(B)$$

If $FG(A)' = -FG(A)$ is used in place of FG(A) under the condition of $\pi/2 < \theta < \pi$, $$Vin = |\cos\theta| \cdot FG(A) + \sin\theta \cdot FG(B) \quad (0 \leq \theta \leq \pi/2)$$

$$Vin = |\cos\theta| \cdot FG(A)' + \sin\theta \cdot FG(B) \quad (\pi/2 < \theta < \pi)$$

Therefore, the resistance values of R1 and R2 are obtained as $$R1:R2 = \sin\theta : |\cos\theta|$$

Consequently $$R1 = \{Z \cdot (\sin\theta + |\cos\theta|)\}/|\cos\theta|$$

$$R2 = \{Z \cdot (\sin\theta + |\cos\theta|)\}/\sin\theta$$

In the above, Z denotes the combined (parallel) resistance values of R1 and R2.

The amplitude of Vin is expressed as $$a/(|\cos\theta| + \sin\theta)$$

Accordingly, for achieving such hysteresis that the output $\pm V$ of the comparator is not inverted until the amplitude of Vin becomes equivalent to 1/H (where H is the amount of the hysteresis), the resistance values of R3 and R4 are calculated as $$R4/(R3 + R4) = \{a/(|\cos\theta| + \sin\theta)\}/V \cdot H$$
$$= a/V \cdot H \cdot (|\cos\theta| + \sin\theta)$$

In this case, $$R3 = \{Z' \cdot V \cdot H \cdot (\sin\theta + |\cos\theta|)\}/a$$

$$R4 = \{Z' \cdot V \cdot H \cdot (\sin\theta + |\cos\theta|)\}/\{V \cdot H \cdot (\sin\theta + |\cos\theta|) - a\}$$

where $Z'$ denotes the combined (parallel resistance value of R3 and R4.

Thereafter the resistance values of R1 to R4 are determined by taking the input impedance of the comparator A1 and so forth into consideration.

Thus, in this embodiment where an inverted signal FG(A)' of the signal FG(A) is used in a range of $\pi/2 < \theta < \pi$, the circuits relevant to the signals So0 to So15 are so constituted as shown in FIG. 8, whereby the entire circuit configuration can be simplified with an advantage of simplifying the calculation of the resistance values as well.

Referring back to FIG. 7 again, the 16 signals So0 to So15 (shown in FIG. 10A) outputted from the circuitry 203 are supplied to an exclusive OR circuit 212, which then produces pulses P16 (shown in FIG. 10B) whose frequency is 16 times that of the signal FG(A). The pulses P16 thus obtained are supplied to an edge extractor 213, which extracts the leading and trailing edges of the pulses P16 in accordance with clock pulses CK' sufficiently faster than the pulses P16. Consequently the edge extractor 213 delivers pulses P32 (shown in FIG. 10C) whose frequency is 32 times that of the signal FG(A).

The signals So0, So8 outputted from the circuitry 203 are supplied to a timer 214, which detects the time difference (corresponding to the phase difference) between the signals So0 and So8, and also detects the period of the signal So0. Such detection signals are supplied via the CPU bus 102 to the CPU 100.

In case the condition that the signals FG(A) and FG(B) have the same amplitude with a 90° phase difference and without any offset therebetween is not satisfied, it becomes impossible in the circuitry 203 to obtain the desired signals So0 to So15 mutually having a phase difference of $\pi k/16$ (where $k=0, 1 \ldots 15$). Therefore, in the pulse generator 23 of FIG. 7, there is executed the following adjustment automatically under control of the CPU 100 (as shown in FIG. 11).

First the tape is moved forward (step 221). Then the gains of the multipliers 209 and 208 are set to 0 and 1 respectively (step 222).

Subsequently the subtractive signals (voltages) are applied to the subtracters 202, 206 so that the offset (DC voltage) between the signals FG(A) and FG(B) detected by the A-D converter 210 becomes zero (step 223).

Thereafter the multiplicative signal (gain) is applied to the multiplier 209 so that the time difference between the signals So0 and So8 detected by the timer 214 becomes equivalent to ¼ period of the signal So0 (step 224).

And finally the multiplicative signal (gain) is applied to the multiplier 208 so that the amplitude of the signal FG(A) detected by the A-D converter 210 becomes equal to the amplitude of the signal FG(B) (step 225).

As a result of such adjustment, high-precision pulses P32 can be produced without being affected by the precision relative to the phase difference between the signals FG(A) and FG(B) and the amplitude thereof.

The track inclination waveform signal STT and the tracking waveform signal STK based on the difference between the envelope signals Sae and Sbe adjusted in the following procedure.

Figure 12:
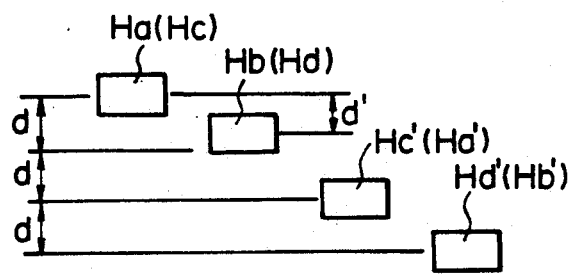
FIG. 12 schematically shows an exemplary arrangement of magnetic heads.
Figure 24:
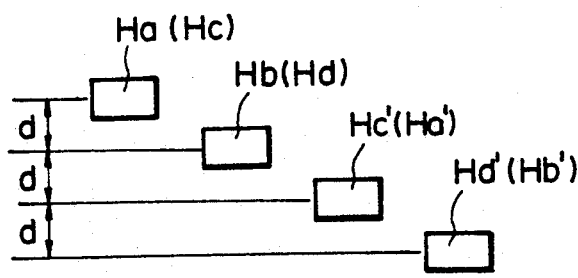
FIG. 24 shows a conventional arrangement of magnetic heads.
Figure 25:
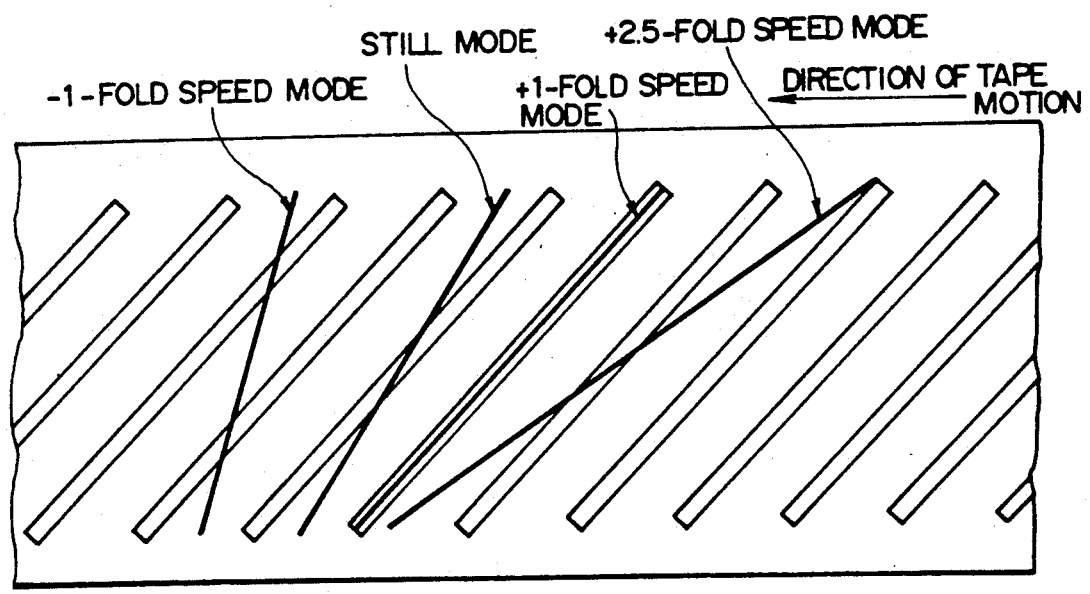
FIG. 25 illustrates scanning loci of the heads.

In contrast with the aforementioned conventional examples of FIG. 24 where the heads are disposed at a fixed distance d, the embodiment of the present invention is so contrived that the distance between the channel-A heads Ha, Hb and the distance between the channel-B heads Hc, Hd are set to d' ($<d$) as shown in FIG. 12, and an offset $\Delta d$ ($d-d'$) is provided between the heads Ha, Hb (Hc, Hd).

Figure 13:
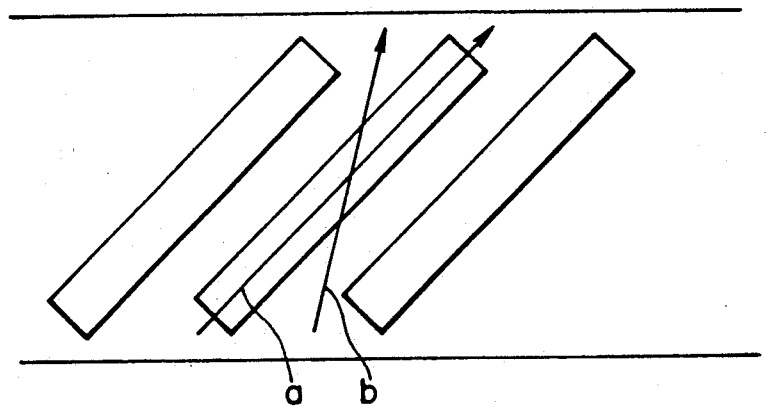
FIG. 13 illustrates scanning lock of the heads.
Figure 14A:
FIG. 14A and 14B show waveforms of envelope signals.
Figure 14B:

In FIG. 13, a solid line a represents the scanning locus of a head when the track inclination waveform signal STT is normal, while a solie line b represents the acanning locus of a head when the signal STT is abnormal. FIGS. 14A and 14B show the envelopes of reproduced RF signals corresponding to such scanning loci of the head represented by the solid lines a and b.

Figure 15:
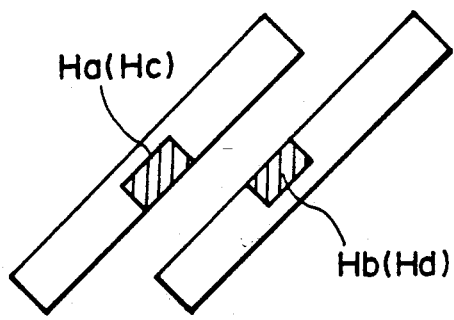
FIG. 15 schematically shows an offset between the heads.
Figure 16A:
FIG. 16A to 16C show waveforms of envelope signals.
Figure 16B:
Figure 16C:
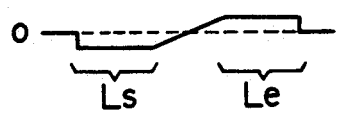

Since the offset $\Delta d$ is provided between the heads Ha and Hb (Hc and Hd) in this embodiment as shown in FIG. 15, when the inclination waveform signal STT is abnormal, the envelopes Sae, Sbe of the reproduced RF signals from the head Ha (Hc) and Hb (Hd) becomes such as shown in FIGS. 16A and 16B, and the difference signal therebetween is such as shown in FIG. 16C.

The direction of the track deviation at any point of the envelope can be detected from whether the difference signal is positive or negative. And the inclination error (direction and amount of inclination) can be detected by integrating (or adding) the start levels Ls and the end levels Le of the envelopes individually and comparing the respective levels with each other.

In the track inclination waveform output circuit 13 (shown in FIG. 1), an amplitude control is executed on the basis of the inclination error data to optimize a(s) in Eq. (1). In this case, the amplitude is so controlled that the start level Ls and the end level Le are rendered coincident with each other.

Figure 17:
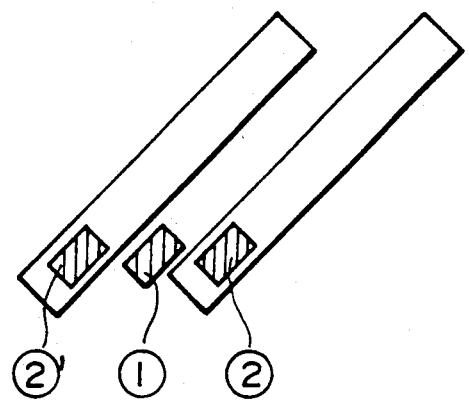
FIG. 17 schematically shows track deviations.

FIG. 17 illustrates track deviations caused when p(s) in Eq. (2) is not adequate. When a tape position corresponding to half the track pitch is held, the playback head scans the position (1) if no correction is executed for the tracking waveform signal STK. In case p(s) is adequate, the head is placed at the proper position (2) or (2)' to signify that the tracking is satisfactory.

However, when the amplitude is smaller or greater, the head fails to take the proper position (2) or (2)' to eventually induce a track deviation. In this case, the position can be normalized by changing p(s) in Eq. (2).

Figure 18:
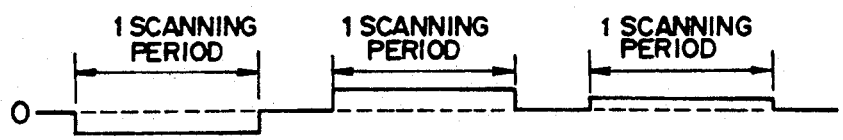
FIG. 18 shows the difference signal between the envelope signals in each scanning.

Also when p(s) is not adequate, the direction of the track deviation can be detected by comparing the envelope signals Sae and Sbe with each other. In this case, the difference between the envelope signals Sae and Sbe is changed every scanning as shown in FIG. 18, so that the direction can be discriminated in accordance with the result of integrating (or adding) the difference signal during each scanning period.

Figure 19:
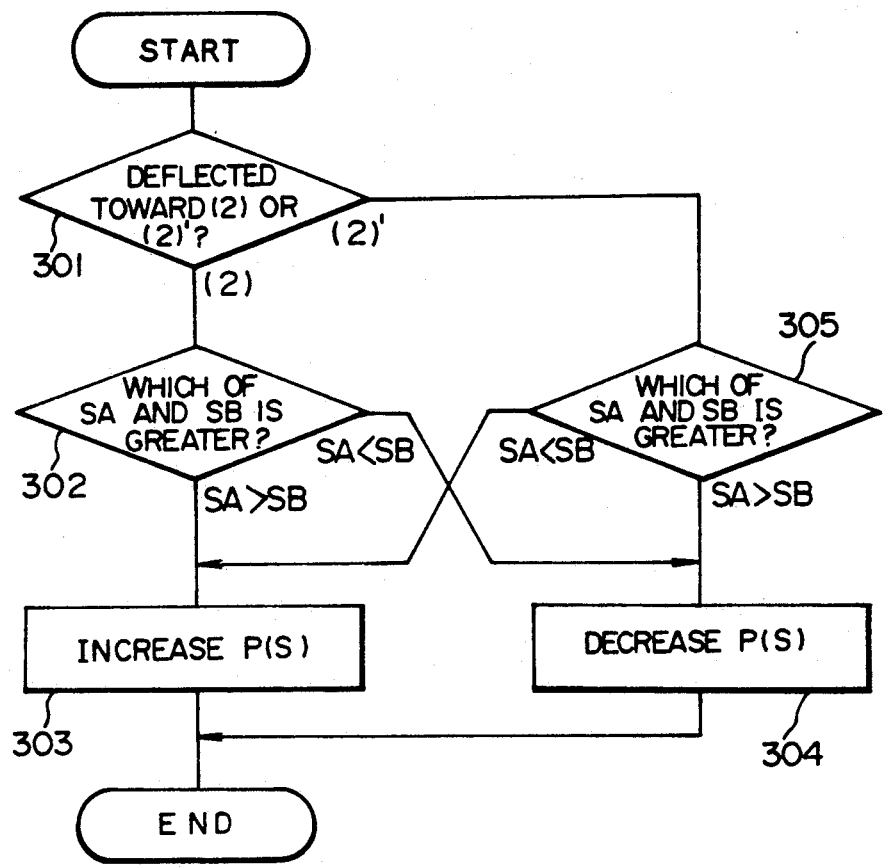
FIG. 19 is a flow chart showing the process to adjust p(s) in a tracking waveform signal.

In the tracking waveform output circuit 24 (shown in FIG. 1), the amplitude is controlled to optimize p(s) in Eq. (2) on the basis of the track deviation data. FIG. 19 is a flow chart showing the process of such control. Denoted by SA and SB are the results of integrating (or adding) the envelope signals Sae and Sbe during each scanning period.

First a decision is made as to whether the head is deflected toward (2) or (2)' (step 301). When the deflection is toward the position (2), a decision is made again as to which of SA and SB is greater (step 302). And if the result signifies SA>SB, p(s) is increased (step 303). Meanwhile, if the result signifies SA<SB to the contrary, p(s) is decreased (step 304).

Practically, the variation pattern of the amplitude h (Eq. (2)) is changed indefinitely depending on the tape speed, so that it is necessary to set an adequate amount of increase or decrease in conformity with each pattern.

Figure 20:
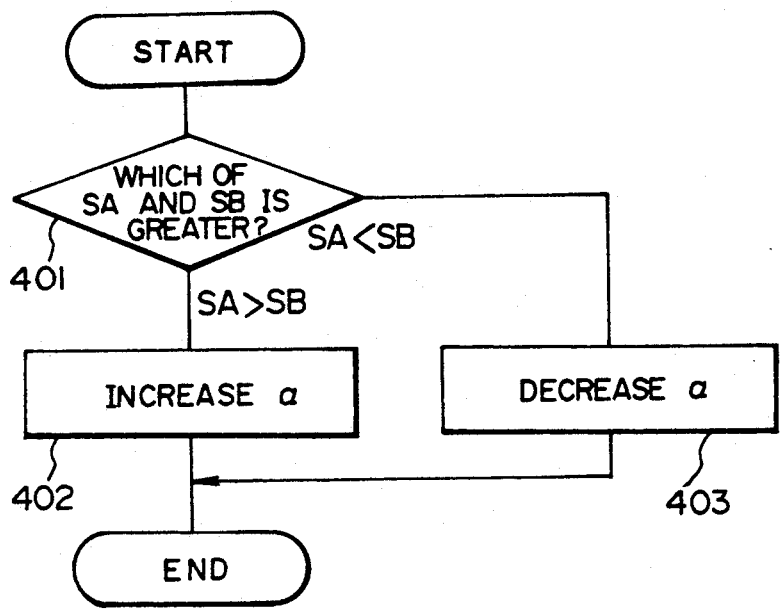
FIG. 20 is a flow chart showing the process to adjust a parameter α to determine a DC offset.
Figure 21:
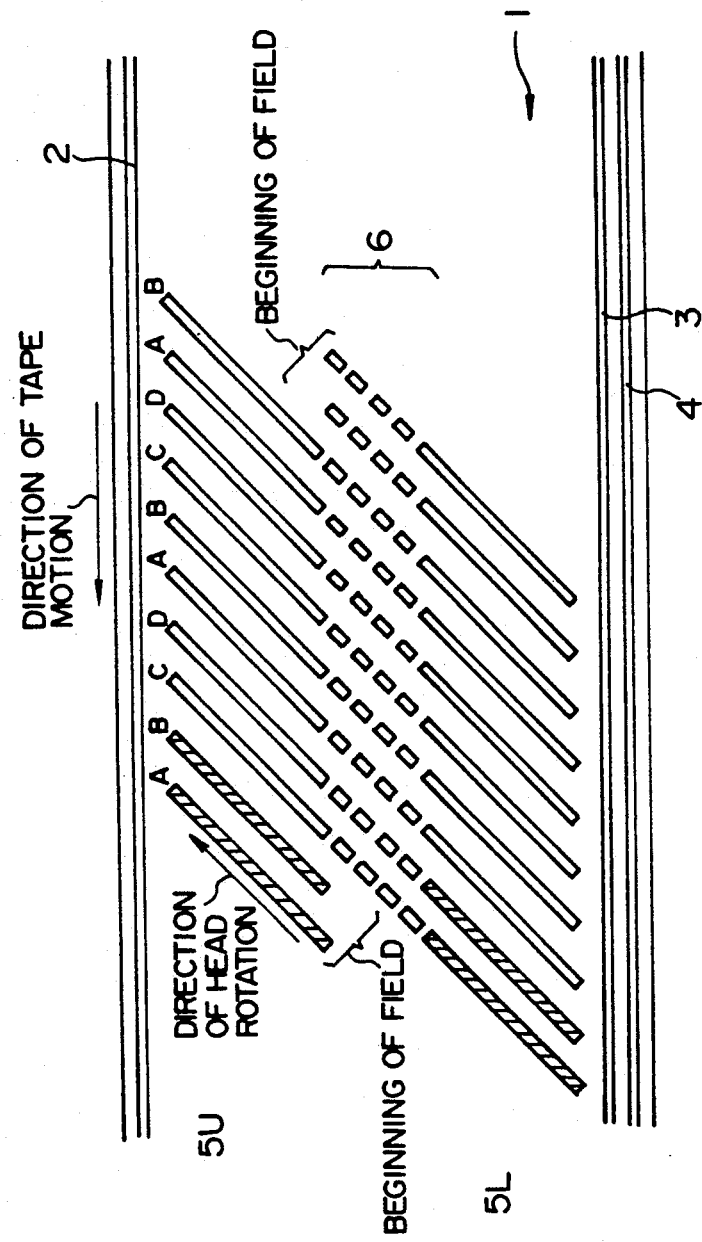
FIG. 21 illustrates a track pattern in the D−1 format.
Figure 22:
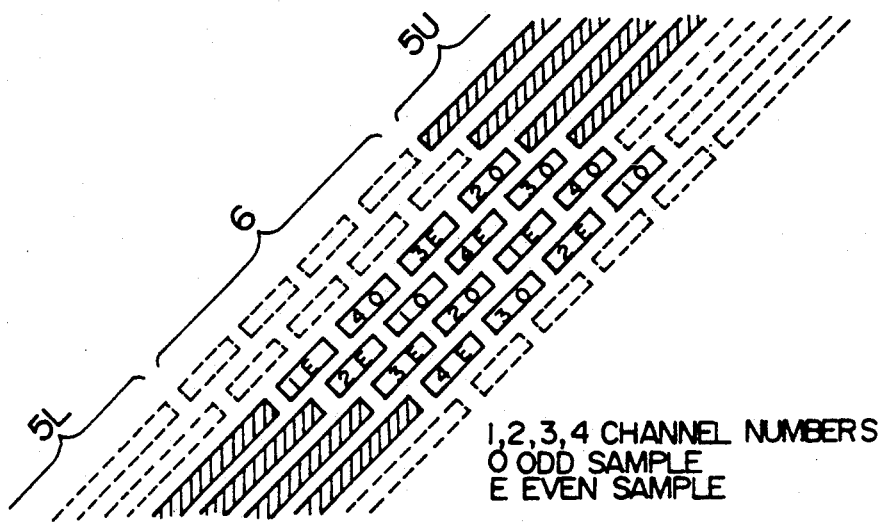
FIG. 22 schematically shows an arrangement of audio sectors.

The DC offset can be adjusted on the basis of the difference between the signals SA and SB. FIG. 20 is a flow chart showing the procedure of such process, wherein $\alpha$ denotes a parameter to determine the DC offset.

First a decision is made as to which of the signals SA and SB is greater (step 401). When the result of such decision signifies SA>SB, $\alpha$ is increased (step 402). In the case of SA>SB to the contrary, $\alpha$ is decreased (step 403). The adjustment of the DC offset can also be achieved by changing, for example, the amplitude of the tracking waveform signal STK obtained from the tracking waveform output circuit 24.

Thus, it becomes possible to maintain the optimized tracking despite any characteristic variation or tape condition variation by modifying the fundamental parameters a(s), p(s) and $\alpha$ through the use of envelope signals Sae and Sbe.

In the embodiment mentioned above, notice is directed merely to the difference between the envelope signals Sae and Sbe. Practically, however, there exist steady or periodic changes in the signals Sae and Sbe depending on the recording pattern. Therefore, it is necessary to once detect the tracking which maximizes the signals Sae and Sbe, and then to combine the operations for maximizing the signals Sae and Sbe.

According to the present invention, the bimorph drive signal is optimized on the basis of the difference between the envelope signals, so that satisfactory tracking can be realized continuously by automatic repetition of such optimizing process.

What is claimed is:

1. A tracking control device for controlling the positions of magnetic heads mounted on bimorphs relative to a recording medium, comprising:

means for detecting the transport speed of said recording medium;

means for generating a first drive signal in response to the output of said speed detecting means;

means for detecting the position of said recording medium;

means for generating a second drive signal in response to the output of said position detecting means and the output of said speed detecting means;

means for detecting any track deviation in response to the output of each head;

means for generating a third drive signal in response to the output of said deviation detecting means;

means for adding said first, second and third drive signals; and means for supplying the output of said adding means to the relevant bimorph;

wherein at least two of said magnetic heads are so disposed as to have an offset therebetween, and said drive signal generating means are controlled on the basis of the difference between the envelope signals outputted from said heads.

2. The device according to claim 1, wherein said position detecting means comprises:

means for generating first and second sinusoidal signals having a predetermined phase difference therebetween;

means for inverting the phase of said first sinusoidal signal to form a third sinusoidal signal;

means for weighting and adding said first or third sinusoidal signal and said second sinusoidal signal; and means with hysteresis for comparing the output signal of said adding means with a reference value, and generating a pulse signal.

3. The device according to claim 1, wherein said position detecting means comprises:

means for weighting and adding first and second sinusoidal signals having a predetermined phase difference therebetween;

means for comparing the output signal of said adding means with a reference value, and generating a pulse signal;

means for correcting the amplitude of said first or second sinusoidal signal; and means for correcting the phase of said first or second sinusoidal signal.

4. The device according to claim 1, wherein said second drive signal generating means includes:

a first memory for storing a plurality of reference waveform data;

a second memory for storing coefficient data relative respectively to said plurality of reference waveform data;

a multiplier for multiplying said plurality of reference waveform data read out by time division repeatedly from said first memory, by the coefficient data read out from said second memory and relative respectively to said reference waveform data; and a sample-and-hold circuit for sampling, from the output data of said multiplier, the data relevant to said plurality of reference waveform data and producing a plurality of waveform signals in parallel repeatedly.

* * * * *